United States Patent [19]

Alberts et al.

[11] 4,357,267

[45] Nov. 2, 1982

[54] THERMOPLASTIC MOULDING COMPOSITIONS OF CELLULOSE ESTERS

[75] Inventors: Heinrich Alberts; Winfried Fischer, both of Cologne; Friedemann Müller, Neuss; Horst Peters, Leverkusen; Christian Leuschke, Dormagen; Hans-Peter Baasch, Bergisch Gladbach, all of Fed. Rep. of Germany

[73] Assignee: Bayer Aktiengesellschaft, Leverkusen, Fed. Rep. of Germany

[21] Appl. No.: 215,328

[22] Filed: Dec. 11, 1980

[30] Foreign Application Priority Data

Dec. 21, 1979 [DE] Fed. Rep. of Germany ....... 2951747

[51] Int. Cl.$^3$ .......................... C08L 1/10; C08L 1/14
[52] U.S. Cl. ....................................... 524/40; 524/41; 524/533

[58] Field of Search .... 260/17 A, 17.4 GC, 17.4 UC, 260/17.4 CL

[56] References Cited

U.S. PATENT DOCUMENTS

| | | | |
|---|---|---|---|
| 2,787,602 | 4/1957 | Groves | 260/17.4 CL |
| 3,088,791 | 5/1963 | Cline et al. | 260/17 A |
| 3,645,939 | 2/1972 | Gaylord | 260/17 A |
| 4,267,090 | 5/1981 | Heimberg et al. | 260/17 A |

*Primary Examiner*—John Kight, III
*Assistant Examiner*—Nathan M. Nutter
*Attorney, Agent, or Firm*—Connolly and Hutz

[57] ABSTRACT

Transparent thermoplastic moulding compositions having improved mechanical properties consist essentially of a cellulose ester of aliphatic $C_1$–$C_5$-carboxylic acids and a graft copolymer of an ethylene vinyl ester copolymer having grafted thereon polymerized units of vinyl esters and/or alkyl esters of acrylic and/or methacrylic acid and, optionally, $C_2$–$C_4$-olefins.

4 Claims, No Drawings

THERMOPLASTIC MOULDING COMPOSITIONS OF CELLULOSE ESTERS

This invention relates to thermoplastic moulding compositions of organic cellulose esters and ethylene-vinyl ester copolymers modified by grafting with vinyl monomers, particularly with unsaturated esters.

Moulding compositions of cellulose acetate cannot be thermoplastically processed without the addition of plasticisers because this ester begins to decompose before softening. The softening and decomposition temperatures of cellulose acetopropionates and acetobutyrates are also so close to one another that these moulding compositions also have to be mixed with plasticisers before thermoplastic processing to ensure that the necessary reductions in the processing temperature and in the processing viscosity are obtained.

Plasticisers for organic cellulose esters are, in the main, aliphatic esters of phthalic acid, adipic acid, azelaic acid, sebacic acid and phosphoric acid, such as for example dimethyl phthalate, diethyl phthalate, dibutyl adipate, dioctyl adipate, dibutyl azelate, trichloroethyl phosphate and tributyl phosphate. In many cases, it is also advantageous to use plasticiser mixtures.

Although the cellulose ester moulding compositions modified with plasticisers show very good transparency, it would be desirable further to improve their dimensional stability under heat for certain applications. In addition, the plasticisers gradually migrate to the surface of the mouldings so that, for example, films of modified cellulose esters cannot be used for packaging certain foods.

Mixtures of organic cellulose esters, low molecular weight plasticisers and olefin polymers are known from German Auslegeschrift No. 1,303,219. However, where their content of olefin polymers is relatively high, moulding compositions of this type are no longer transparent. In addition, conventional low molecular weight esters with their well-known disadvantages are used as plasticisers in these known moulding compositions.

The use of polymeric plasticisers for cellulose mixed esters is also known. U.S. Pat. No. 3,682,850 describes thermoplastic mixtures of 40 to 90% by weight of cellulose esters and 10 to 60% by weight of an ethylene-vinyl acetate copolymer having a vinyl acetate content of from 75 to 99% by weight, which are characterised by high mechanical strength values and high transparency.

In addition, German Offenlegungsschrift No. 2,426,178 describes transparent thermoplastic moulding compositions of organic cellulose esters and ethylene-vinyl ester copolymers. The ethylene-vinyl ester copolymers used contain from 30 to 98% and preferably from 60 to 98% by weight of incorporated vinyl ester.

Mixtures of cellulose mixed esters and ethylene-vinyl ester copolymers containing less than 75% by weight of incorporated vinyl ester in the ethylene copolymer component are transparent within certain limits, but with an increasing proportion by weight of the ethylene-vinyl ester copolymer in the mixture show an increasing tendency towards crazing under flexural or tensile stressing.

This reduction in transparency is undesirable for special applications. At the same time, the inadequate compatibility of the polymers complicates the production of soft, flexible moulding compositions which are also required to show high transparency without crazing under extreme tensile or flexural stressing.

It has now been found that the disadvantages referred to above can be obviated and that highly transparent, soft and flexible moulding compositions based on organic cellulose esters and ethylene-vinyl ester copolymers containing up to 75% by weight of incorporated vinyl ester can be obtained, providing cellulose esters of aliphatic carboxylic acids are mixed with graft products of vinyl monomers, particularly of unsaturated esters and ethylene-vinyl ester copolymers.

Accordingly, the present invention provides thermoplastic moulding compositions consisting essentially of
(1) from 1 to 99% by weight, preferably from 40 to 95% by weight, of a cellulose ester of one or more aliphatic $C_1$–$C_5$-carboxylic acids, and
(2) from 99 to 1% by weight, preferably from 5 to 60% by weight, of a graft copolymer of
 (a) from 5 to 90% by weight of an ethylene-vinyl ester copolymer, containing from 5 to 75% by weight of incorporated vinyl ester, as the graft substrate and polymerized units of
 (b) from 10 to 95% by weight of vinyl esters and/or alkyl esters of acrylic and/or methacrylic acid, and
 (c) from 0 to 20% by weight of $C_2$–$C_4$-$\alpha$-olefins, the sum of components (1) and (2) and (a) to (c) always amounting to 100% by weight.

Suitable cellulose esters for producing the moulding compositions according to the invention are cellulose esters of aliphatic carboxylic acids containing from 1 to 5 carbon atoms, preferably cellulose acetate, acetopropionate and acetobutyrate.

Processes for the production of organic cellulose esters have long been known and are described, for example, in Ullmanns Encyclopädie der technischen Chemie (Verlag Urban u. Schwarzenberg, Munich-Berlin, 1963), Vol. 5, pages 182 to 201.

Preferred cellulose acetobutyrates contain from 40 to 50% by weight of butyric acid groups, and from 15 to 26% by weight of acetic acid groups.

Cellulose acetobutyrates having the following composition are particularly preferred for the moulding compositions according to the invention:
42 to 46% by weight of butyric acid groups, and
18 to 22% by weight of acetic acid groups.

Preferred cellulose acetopropionates generally contain from 50 to 66% by weight of propionic acid groups, and from 1 to 12% by weight of acetic acid groups whilst particularly preferred cellulose acetopropionates have the following composition:
54 to 60% by weight of propionic acid groups, and
4 to 9% by weight of acetic acid groups.

Of the cellulose acetates, secondary cellulose acetates are preferably used.

The relative viscosities ($\eta_{rel}$) of 2% by weight solutions in acetone of the aliphatic cellulose esters used amount to between 2.5 and 6.0 and preferably to between 3.5 and 5.0 at 20° C.

The ethylene-vinyl ester copolymers used as graft substrate are obtained by the known processes of high-pressure or medium-pressure synthesis, optionally in solvents, such as tertiary butanol.

Suitable vinyl esters are organic vinyl esters of saturated, optionally halogen-substituted, particularly chlorine-substituted, aliphatic monocarboxylic acids containing from 1 to 18 carbon atoms or aromatic monocarboxylic acids containing from 7 to 11 carbon atoms, such as vinyl formate, vinyl acetate, vinyl propionate, vinyl chloropropionate, vinyl butyrate, vinyl caproate, vinyl laurate, vinyl myristate, vinyl stearate and vinyl benzoate, preferably vinyl acetate.

The ethylene-vinyl ester copolymers produced by the high-pressure synthesis process have melt index values (as measured at 190° C. under a load of 2.16 kp in accordance with DIN 53 735) of from 0.1 to 100, preferably from 1.0 to 10 and, more particularly, from 3.5 to 6. The intrinsic viscosities $[\eta]$ as measured in tetralin at 120° C. are generally in the range of from 0.6 to 1.5 [dl/g]. The molecular weights as determined by the light scattering method are preferably in the range of from 50,000 to 1,000,000. The inconsistency factor U defined by the relation $M_w/M_n - 1$ (G. Schultz, z. phys. Chem. (B) 43 (1939) pages 25 to 34) lies in the range from 5 to 30. These copolymers are soluble in hydrocarbons or alcohols.

The ethylene-vinyl ester copolymers produced, for example, by solution or emulsion polymerization and containing from 5 to 75% by weight of vinyl ester and preferably from 25 to 55% by weight of vinyl ester have melt index values (as measured at 190° C. under a load of 2.16 kp) which can exceed 100, although the melt index range is preferably below 15 and more particularly between 0.5 and 5. The molecular weights as determined by light scattering are preferably in the range of from 40,000 to 1,000,000. The inconsistency factor U is from 1 to 15. The copolymers are soluble in hydrocarbons and alcohols and preferably have intrinsic viscosities $[\eta]$ of from 0.5 to 2.5 [dl/g] in toluene.

The monomers used for producing the graft polymers are primarily vinyl esters and/or alkyl esters of (meth)acrylic acid. Suitable esters are the $C_1$-$C_{14}$- and preferably the $C_1$-$C_4$-alkyl esters of acrylic and/or methacrylic acid, such as methyl (meth)acrylate, ethyl (meth)acrylate, n-propyl and isopropyl (meth)acrylate, n-butyl and isobutyl (meth)acrylate and 2-ethylhexyl (meth)acrylate. Suitable vinyl esters are the vinyl esters of aliphatic or aromatic monocarboxylic acids as described earlier on, preferably vinyl acetate. Other suitable monomers are $C_2$-$C_4$-$\alpha$-olefins, such as ethylene, propylene and isobutylene, and optionally acrylic acid and methacrylic acid.

Unless transparent graft copolymers are required, it is also possible to use aromatic vinyl compounds, such as styrene or $\alpha$-methyl styrene, optionally in admixture with the (meth)acrylic esters.

The graft polymerization reaction is carried out in solution or in bulk. Suitable solvents are hydrocarbons, such as benzene, toluene or xylene, alcohols such as methanol, ethanol, propanol, isopropanol, n-butanol or tert.butanol, chlorinated hydrocarbons such as chlorobenzene, methylene chloride or tetrachloroethylene, methyl, ethyl or butyl acetate and glacial acetic acid, or mixtures thereof.

The graft polymerization reaction is preferably carried out in homogeneous phase although, in principle, it may also be carried out in heterogeneous phase. It is also entirely possible initially to prepare a homogeneous phase of graft substrate, vinyl monomers and, optionally, solvent, to disperse the solution in water and then to carry out polymerization optionally after the addition of a catalyst.

The graft reaction may even be carried out in the presence or absence of solvents in polymerization screws, and the solvent or the residual monomers may be evaporated from the graft polymerization mixture in evaporation screws, thin-layer evaporators or spray dryers.

The polymerization reaction is carried out at temperatures in the range of from $-20°$ C. to $+250°$ C., preferably at temperatures in the range of from $+30°$ C. to $+180°$ C., and under pressures between normal pressure and 300 bars, preferably under pressures of up to 25 bars.

The polymerization catalysts may be added to the polymerization mixture before, during or after the dissolving or mixing step. The catalysts are preferably introduced into the reaction mixture with the monomers or separately from the monomers after preparation of the homogeneous graft substrate solution.

The polymerization catalysts are best used in a quantity of from 0.001 to 2% by weight, based on the sum of graft substrate and graft monomers. These quantities may, of course, be considerably exceeded.

Per compounds or azo compounds or radical-yielding highly substituted ethane derivatives, such as benzpinacol for example, may be used as the polymerization catalysts. Examples of suitable polymerization catalysts are benzoyl peroxide, tert.-butyl perpivalate, lauroyl peroxide, tert.-butyl peroctoate, tert.-butyl perbenzoate, di-tert.-butyl peroxide, tert.-butyl perisononanate, diisopropyl percarbonate, dicyclohexyl percarbonate, dicumyl peroxide, tert.-butyl perneodecanoate, azo-bis-isobutyronitrile or esters of azo-bis-isobutyric acid, such as for example its bis-ethyl ester.

Initiator radicals may also be produced by known redox systems or even by UV-radiation, actinic light or accelerated electrons.

The moulding compositions according to the invention may optionally be modified by low molecular weight plasticisers.

Suitable low molecular weight plasticisers are dimethyl phthalate, diethyl phthalate, triphenyl phosphate, methyl ethylene glycol phthalate, di-n-butyl sebacate, ethyl butylene glycol phthalate, butyl butylene glycol phthalate, dibutyl phthalate, dioctyl adipate, dioctyl phthalate, butyl benzyl phthalate and triacetine.

In addition, the moulding compositions according to the invention may contain additives, for example to colour and pigment the polymer mixtures, to improve their resistance to oxidation or light or to reduce their inflammability.

The moulding compositions according to the invention of ethylene-vinyl ester graft copolymers and organic cellulose esters show a remarkable increase in notched impact strength as measured in accordance with DIN 53 453. In addition, they are distinguished by improved dimensional stability under heat as measured, for example, in accordance with DIN 53 460 (Vicat softening temperature). The Vicat softening temperatures are up to 40° C. above the softening temperatures of cellulose esters modified with low molecular weight plasticisers.

Compared with these conventional cellulose ester moulding compositions, the polymer mixtures according to the invention also show improved mechanical properties such as, for example, an increase in hardness, tensile strength, flexural strength and elasticity modulus. The known effect of so-called plasticiser migration hardly occurs either, with the result that moulding compositions of the type in question are also particularly suitable, for example, for applications involving contact with foods.

The mixtures of cellulose esters and graft copolymers of ethylene-vinyl ester copolymers according to the present invention may readily be processed continuously and in batches in conventional extruders and injection-moulding machines and, in this respect, show good flow properties.

It is possible to produce mouldings of all kinds as well as acetate rayon, block acetate, film supports for safety films, electrical insulating films and lacquers. The improved resistance of the polymer mixtures to hot air and ageing also enables them to be used for external applications.

The invention is illustrated by the following Examples in which the percentages quoted represent percent by weight.

Production of the Graft Copolymers

EXAMPLE A

In a two-autoclave installation for continuous polymerization which is equipped with two 5-liter reactors with a cooling/heating jacket, monomer and initiator metering units and an internal temperature control system, polymerization is carried out as follows at a reaction temperature of 70° C. The following solutions are introduced hourly into the reactor 1:

Solution 1

0.75 kg of ethylene-vinyl acetate copolymer (EVA) containing 45% of incorporated vinyl acetate,
0.6 kg of vinyl acetate, and
2.95 kg of tert.-butanol.

Solution 2

0.7 kg of vinyl acetate,
0.022 kg of tert,-butyl perpivalate, and
1.5 kg of tert.-butanol.

After an average residence of 40 to 45 minutes in the first reactor and an average monomer conversion of around 85%, the polymer syrup is introduced into the second reactor. The average residence time in the second reactor is approximately 40 minutes. The monomer conversion after leaving the second reactor is substantially 100%. The polymer syrup is worked up in an evaporation screw. The graft product has an intrinsic viscosity $[\eta]$ of 1.52 [dl/g] and has the following composition: 36.5% of EVA and 63.5% of vinyl acetate.

EXAMPLE B

A solution of 4000 g of vinyl acetate and 16.8 g of tert.-butyl perpivalate in 4000 g of tert.-butanol is added under nitrogen over a period of 4 hours at 70° C. to a solution of 4500 g of an ethylene-vinyl acetate copolymer containing 45% of incorporated vinyl acetate and having a Mooney viscosity of 20, in 13,500 g of tert.-butanol accommodated in a 40-liter autoclave. After stirring for 3 hours at 70° C., the graft copolymer formed is isolated by stripping off the volatile fractions in an evaporation screw. The graft copolymer contains 52% of ethylene-vinyl acetate copolymer and 48% of polymerized units of vinyl acetate. The intrinsic viscosity $[\eta]$, as measured in tetrahydrofuran, amounts to 1.53 [dl/g].

Graft copolymers C to H in Table 1 are produced in accordance with this procedure B.

TABLE 1

| Example | EVA [%] | Vinyl acetate [%] | n-butyl acrylate [%] | Ethyl acrylate [%] | $[\eta]$ [dl/g] |
|---|---|---|---|---|---|
| C | 70 | 30 | — | — | 1.75 |
| D | 45 | 55 | — | — | 1.55 |
| E | 16 | — | — | 84 | 1.04 |
| F | 16 | 84 | — | — | 0.43 |
| G | 12 | 88 | — | — | 1.00 |
| H | 50 | 25 | 25 | — | 1.63 |

EXAMPLE J 1500 g of water, 200 g of methyl methacrylate and 50 g of an 8% aqueous solution of a 1:1-copolymer of methacrylic acid and methyl methacrylate (dispersant) adjusted to pH 6.5 with sodium hydroxide are added under nitrogen to an aqueous emulsion of an ethylene-vinyl acetate copolymer (53% vinyl acetate, Mooney viscosity 10) having a solids content of 47%, followed by stirring for 30 minutes at 70° C. The following two solutions are then simultaneously added over a period of 4 hours:

Solution 1

50 g of the 8% dispersant solution diluted with 1250 g of water;

Solution 2

1200 g of methyl methacrylate and 5.0 g of tert.-butyl perpivalate.

The emulsion is then stirred for 2 hours at 70° C. The bead polymer formed is filtered off through a 50μ sieve, washed with water and dried at 50° C. in a recirculating air drying cabinet. A graft polymer, which is insoluble in tetrahydrofuran, is obtained in a yield of 1500 g, consisting of 31% of EVA and 69% of polymerized units of methyl methacrylate.

Production of the Moulding Compositions

EXAMPLES 1 TO 9

Cellulose acetobutyrate containing approximately 45% of butyric acid and approximately 19% of acetic acid groups is intensively mixed on rolls at 170° C. with the quantities of graft copolymers indicated in Table 2, the sum of both components amounting to 100%.

The rough sheets are granulated and subsequently injection-moulded (melt temperature 230° C.) to form test specimens.

The symbols used in Table 2 and 3 have the following meanings:

$a_n$ = impact strength according to DIN 53 453 in [kJ/m$^2$]

$a_k$ = notched impact strength according to DIN 53 453 in [kJ/m$^2$]

Vicat = softening temperature in °C. according to DIN 53 460, method B, force 49.05 [N]

$H_k^{30}$ = ball indentation hardness after 30 s according to DIN 54 456 in [N/mm$^2$]

TABLE 2

| Example | Graft copolymer | [%]$^a$ | $a_n$[kJ/m$^2$] room temp. | −40° C. | $a_k$ [kJ/m$^2$] | Vicat [°C.] | $H_k^{30}$ [N/mm$^2$] |
|---|---|---|---|---|---|---|---|
| 1 | A | 10 | 92 | 84 | 4.6 | 100 | 80 |
| 2 | A | 20 | 86 | 76 | 10.6 | 89 | 75 |

TABLE 2-continued

| Example | Graft copolymer | [%]$^a$ | $a_n$[kJ/m$^2$] room temp. | −40° C. | $a_k$ [kJ/m$^2$] | Vicat [°C.] | $H_k^{30}$ [N/mm$^2$] |
|---|---|---|---|---|---|---|---|
| 3 | B | 10 | 70 | 54 | 4.2 | 101 | 72 |
| 4 | B | 20 | 79 | 50 | 12.9 | 87 | 64 |
| 5 | E | 10 | 72 | 66 | 4.4 | 92 | 63 |
| 6 | F | 10 | 80 | 52 | 2.3 | 97 | 87 |
| 7 | G | 10 | 87 | 70 | 2.5 | 98 | 88 |
| 8 | H | 10 | 65 | 51 | 9.4 | 99 | 63 |
| 9 | J | 10 | 88 | 78 | 1.7 | 110 | 78 |

$^a$based on polymer mixture

EXAMPLES 10 TO 15

Cellulose acetopropionate containing approximately 57.5% of propionic acid and approximately 5.5% of acetic acid groups is intensively mixed on rolls at 170° C. with the quantities of graft polymers indicated in Table 3, the sum of both components amounting to 100%.

The rough sheets are granulated and subsequently injection-moulded (melt temperature 230° C.) to form test specimens.

TABLE 3

| Example | Graft copolymer | [%]$^a$ | $a_n$[kJ/m$^2$] room temp. | −40° C. | $a_k$ [kJ/m$^2$] | Vicat [°C.] | $H_k^{30}$ [N/mm$^2$] |
|---|---|---|---|---|---|---|---|
| 10 | B | 10 | 84 | 75 | 3.2 | 111 | 84 |
| 11 | B | 20 | 73 | 61 | 8.6 | 97 | 74 |
| 12 | E | 10 | 60 | 48 | 3.6 | 105 | 73 |
| 13 | F | 10 | 54 | 51 | 2.1 | 108 | 98 |
| 14 | H | 10 | 73 | 43 | 5.8 | 114 | 69 |
| 15 | J | 10 | 80 | 60 | 2.8 | 124 | 90 |

$^a$based on polymer mixture

We claim:

1. Thermoplastic moulding compositions, consisting essentially of
   (1) from 1 to 99% by weight of a cellulose ester of one or more aliphatic $C_1$–$C_5$-carboxylic acids, and
   (2) from 99 to 1% by weight of a graft copolymer of
      (a) from 5 to 90% by weight of an ethylene-vinyl ester copolymer, containing from 5 to 75% by weight of incorporated vinyl ester, as the graft substrate and polymerized units of
      (b) from 95 to 10% by weight of vinyl esters and/or alkyl esters of acrylic and/or methacrylic acid, and
      (c) from 0 to 20% by weight of $C_2$–$C_4$-α-olefins,
   the sum of components (1) and (2) and (a) to (c) always amounting to 100% by weight.

2. Thermoplastic moulding compositions as claimed in claim 1, consisting essentially of
   (1) from 1 to 99% by weight of a cellulose ester of one or more aliphatic $C_1$–$C_5$-carboxylic acids, and
   (2) from 99 to 1% by weight of a graft copolymer of
      (a) from 5 to 90% by weight of an ethylene-vinyl acetate copolymer, containing from 5 to 75% by weight of incorporated vinyl acetate, as the graft substrate and polymerized units of
      (b) from 95 to 10% by weight of vinyl acetate and/or $C_1$–$C_4$-alkyl esters of acrylic and/or methacrylic acid, and
      (c) from 0 to 20% by weight of $C_2$–$C_4$-α-olefins,
   the sum of components (1) and (2) and (a) to (c) always amounting to 100% by weight.

3. Thermoplastic moulding compositions as claimed in claims 1 or 2, consisting essentially of
   (1) from 40 to 95% by weight of component 1, and
   (2) from 60 to 5% by weight of component 2,
   the sum of components (1) and (2) amounting to 100% by weight.

4. Thermoplastic moulding compositions as claimed in claims 1 or 2, containing as component (1) cellulose acetobutyrate, cellulose acetopropionate, cellulose acetate or mixtures thereof.

* * * * *